United States Patent
Zhang et al.

(10) Patent No.: US 11,290,381 B2
(45) Date of Patent: Mar. 29, 2022

(54) METHOD AND SYSTEM FOR TRANSMITTING DATA RESOURCE ACQUISITION REQUEST

(71) Applicant: WANGSU SCIENCE & TECHNOLOGY CO., LTD., Shanghai (CN)

(72) Inventors: Yu Zhang, Shanghai (CN); Shujia Dong, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 811 days.

(21) Appl. No.: 16/079,732

(22) PCT Filed: Feb. 28, 2018

(86) PCT No.: PCT/CN2018/077554
§ 371 (c)(1),
(2) Date: Aug. 24, 2018

(87) PCT Pub. No.: WO2019/148568
PCT Pub. Date: Aug. 8, 2019

(65) Prior Publication Data
US 2021/0194810 A1    Jun. 24, 2021

(30) Foreign Application Priority Data

Feb. 2, 2018    (CN) .......................... 201810106492.0

(51) Int. Cl.
*H04L 12/803*    (2013.01)
*H04L 47/122*    (2022.01)
(Continued)

(52) U.S. Cl.
CPC ............ *H04L 47/122* (2013.01); *H04L 47/24* (2013.01); *H04L 47/283* (2013.01); *H04L 67/322* (2013.01)

(58) Field of Classification Search
None
See application file for complete search history.

(56) References Cited

U.S. PATENT DOCUMENTS 8,775,564 B1 * 7/2014 Smart ..................... H04L 47/10
709/218
9,722,867 B2 * 8/2017 Zhang ................ H04L 41/0806
(Continued)

FOREIGN PATENT DOCUMENTS

EP    3232710 A1    10/2017

OTHER PUBLICATIONS

The European Patent Office (EPO) the Extended European Search Report for 18796356.6 (PCT/CN2018/077554) dated Mar. 20, 2019 8 Pages.

*Primary Examiner* — Dhairya A Patel (57) ABSTRACT

A method for transmitting a data source acquisition request includes: when there is a need to transmit an acquisition request for a first data source, acquiring, by a first node, traffic scheduling information of a plurality of secondary nodes stored locally corresponding to a source server to which the first data source belongs, where the traffic scheduling information includes a traffic-to-be-split domain name level and a traffic-to-be-split ratio; selecting, by the first node, a target node among the plurality of secondary nodes based on the traffic scheduling information of the plurality of secondary nodes; and transmitting, by the first node, the acquisition request for the first data source to the target node.

11 Claims, 2 Drawing Sheets

(51) Int. Cl.
  *H04L 47/24*     (2022.01)
  *H04L 47/283*    (2022.01)
  *H04L 67/61*     (2022.01)

(56) References Cited

U.S. PATENT DOCUMENTS

| | | | |
|---|---|---|---|
| 10,521,269 B2 * | 12/2019 | Devadas | G06F 9/4887 |
| 2007/0237081 A1 * | 10/2007 | Kodialam | H04L 45/302 |
| | | | 370/235 |
| 2007/0253403 A1 * | 11/2007 | Kodialam | H04L 45/14 |
| | | | 370/351 |
| 2009/0016231 A1 * | 1/2009 | Li | H04L 5/0007 |
| | | | 370/252 |
| 2011/0134769 A1 * | 6/2011 | Lee | H04L 45/125 |
| | | | 370/252 |
| 2012/0110165 A1 * | 5/2012 | Thomas | H04L 41/147 |
| | | | 709/224 |
| 2012/0281575 A1 * | 11/2012 | Iwata | H04L 43/10 |
| | | | 370/252 |
| 2013/0179551 A1 * | 7/2013 | Li | H04L 61/1511 |
| | | | 709/223 |
| 2015/0085800 A1 * | 3/2015 | Sivanesan | H04L 1/1887 |
| | | | 370/329 |
| 2015/0326496 A1 * | 11/2015 | Ramon Salguero | ........ |
| | | | H04L 41/5041 |
| | | | 709/226 |
| 2017/0366448 A1 * | 12/2017 | Hei | H04L 67/2842 |
| 2017/0366467 A1 * | 12/2017 | Martin | H04L 47/2433 |
| 2018/0293111 A1 * | 10/2018 | Chen | G06F 9/5083 |
| 2021/0342785 A1 * | 11/2021 | Mann | G06F 16/9536 |

\* cited by examiner

FIG. 1

```
┌─────────────────────────────────────────────────────────────┐
│ When there is a need to transmit an acquisition request for a first data │──201
│ source, the first node acquires traffic scheduling information of a plurality │
│ of secondary nodes stored locally corresponding to a resource serve to │
│                which the first data source belongs                │
└─────────────────────────────────────────────────────────────┘
                              ↓
┌─────────────────────────────────────────────────────────────┐
│ The first node selects a target node among the plurality of secondary nodes │──202
│     based on the traffic scheduling information of the plurality of secondary     │
│                                nodes                                │
└─────────────────────────────────────────────────────────────┘
                              ↓
┌─────────────────────────────────────────────────────────────┐
│ The first node transmits the acquisition request for the first data source to │──203
│                            the target node                            │
└─────────────────────────────────────────────────────────────┘
```

METHOD AND SYSTEM FOR TRANSMITTING DATA RESOURCE ACQUISITION REQUEST

CROSS-REFERENCES TO RELATED APPLICATIONS

This application is a national phase entry under 35 U.S.C § 371 of International Application No. PCT/CN2018/077554 filed on Feb. 28, 2018, which claims priority of Chinese Patent Application No. 2018101064920, filed with the State Intellectual Property Office of P. R. China on Feb. 2, 2018, the entire contents of all of which are incorporated herein by reference.

FIELD OF THE DISCLOSURE

The present disclosure generally relates to the field of data transmission technology and, more particularly, to a method and a system for transmitting a data resource acquisition request.

BACKGROUND

As the Internet technology develops continuously, Content Delivery Network (CDN) services have also developed rapidly. The CDN service cluster includes a large number of node servers for storing data resources and accelerating network services. The node servers may include edge node servers (hereinafter referred to as "edge nodes") and parent node servers (hereinafter referred to as a "parent nodes", which include dynamic parent nodes and static parent nodes).

When a user wants to acquire a specific data resource, the user may, through a terminal, transmit an acquisition request for the data resource to the CDN service cluster, such that an edge node in the CDN service cluster can receive the acquisition request. If the data resource is not stored locally, the edge node may select an optimal path for back-to-source processing to acquire the data resource. That is, the acquisition request for the data resource may be transmitted to a corresponding resource server through dynamic parent node(s) on the optimal path.

When implementing the present disclosure, the inventors found at least following issues in the existing technologies:

If at a certain moment, there exists a large number of back-to-source demands for data resources in the edge nodes and the corresponding optimal paths pass through the same dynamic parent node, such dynamic parent node may need to forward a large number of data resource acquisition requests at the same time. As a result, the back-to-source efficiency of the dynamic parent node may be reduced due to the continuous overload of the traffic, and the quality of the back-to-source acceleration service of the CDN service cluster becomes poorer.

BRIEF SUMMARY OF THE DISCLOSURE

To solve the issues in the existing technologies, embodiments of the present disclosure provide a method and a system for transmitting a data resource acquisition request. The technical solutions are as follows:

In a first aspect, a method for transmitting a data resource acquisition request is provided. The method includes:

when there is a need to transmit an acquisition request for a first data resource, acquiring, by a first node, traffic scheduling information of a plurality of secondary nodes stored locally corresponding to a resource server to which the first data resource belongs, where the traffic scheduling information includes traffic-to-be-split domain name level and traffic-to-be-split ratio;

selecting, by the first node, a target node among the plurality of secondary nodes based on the traffic scheduling information of the plurality of secondary nodes; and transmitting, by the first node, the acquisition request for the first data resource to the target node.

Optionally, the method further includes:

periodically acquiring, by a second node, historic traffic corresponding to each domain name level in a historic cycle, to predict latest traffic corresponding to each domain name level in a current cycle;

determining, by the second node, traffic scheduling information of the second node based on a preset traffic-splitting threshold and the latest traffic corresponding to each domain name level.

Optionally, the determining, by the second node, traffic scheduling information of the second node based on a preset traffic-splitting threshold and the latest traffic corresponding to each domain name level includes:

adding, by the second node, the latest traffic corresponding to each domain name level starting from a highest domain name level;

when an adding result is greater than the preset traffic-splitting threshold, stopping adding and determining, by the second node, a domain name level corresponding to lastly added latest traffic as the traffic-to-be-split domain name level;

determining, by the second node, a ratio of a difference between the adding result and the preset traffic-splitting threshold to latest traffic corresponding to the traffic-to-be-split domain name level as the traffic-to-be-split ratio.

Optionally, the method further includes:

periodically transmitting, by the first node, a probing message to each of the plurality of secondary nodes;

receiving, by the first node, a probing response fed back by each of the plurality of secondary nodes, and determining, by the first node, a network delay between the first node and each of the plurality of secondary nodes; and configuring, by the first node, a priority level for each of the plurality of secondary nodes based on the network delay, where a secondary node with a higher priority level corresponds to a smaller network delay.

Optionally, the selecting, by the first node, the target node among the plurality of secondary nodes based on the traffic scheduling information of the plurality of secondary nodes includes:

sequentially selecting, by the first node, a candidate node from the plurality of secondary nodes based on a descending order of priority levels; and when a domain name level of the resource server to which the first data resource belongs is equal to traffic-to-be-split domain name level included in the traffic scheduling information of the candidate node and the acquisition request of the first data resource does not satisfy preset traffic-splitting criteria, or when the domain name level of the resource server to which the first data resource belongs is greater than the traffic-to-be-split domain name level included in the traffic scheduling information of the candidate node, determining, by the first node, the candidate node to be the target node.

Optionally, the probing response fed back by each of the plurality of secondary nodes includes traffic scheduling information carried thereby respectively, and after receiving, by the first node, the probing response fed back by each of the plurality of secondary nodes, the method further includes:

updating, by the first node, traffic scheduling information of each of the plurality of secondary nodes stored locally based on traffic scheduling information carried in the probing response.

Optionally, the method further includes:

receiving, by the first node, a request response for a second data resource sent by a third node; and updating, by the first node, traffic scheduling information of the third node stored locally based on traffic scheduling information of the third node carried in the request response.

In a second aspect, a system for transmitting a data resource acquisition request is provided. The system comprises a plurality of nodes, where the plurality of nodes includes a first node that is configured to:

when there is a need to transmit an acquisition request for a first data source, acquire traffic scheduling information of a plurality of secondary nodes stored locally corresponding to a source server to which the first data source belongs, where the traffic scheduling information includes traffic-to-be-split domain name level and traffic-to-be-split ratio;

select a target node among the plurality of secondary nodes based on the traffic scheduling information of the plurality of secondary nodes; and transmit the acquisition request for the first data source to the target node.

Optionally, the plurality of nodes further includes a second node, and the second node is configured to:

periodically acquire historic traffic corresponding to each domain name level in a historic cycle, to predict latest traffic corresponding to each domain name level in a current cycle; and determine traffic scheduling information of the second node based on a preset traffic-splitting threshold and the latest traffic corresponding to each domain name level.

Optionally, the second node is specifically configured to:

add latest traffic corresponding to each domain name level starting from a highest domain name level;

when an adding result is greater than the preset traffic-splitting threshold, stop adding and determine a domain name level corresponding to lastly added latest traffic as the traffic-to-be-split domain name level;

determine a ratio of a difference between the adding result and the preset traffic-splitting threshold to latest traffic corresponding to the traffic-to-be-split domain name level as the traffic-to-be-split ratio.

Optionally, the first node is further configured to:

periodically transmit a probing message to each of the plurality of secondary nodes;

receive a probing response fed back by each of the plurality of secondary nodes, and determine a network delay between the first node and each of the plurality of secondary nodes; and configure a priority level for each of the plurality of secondary nodes based on the network delay, where a secondary node with a higher priority level corresponds to a smaller network delay.

Optionally, the first node is specifically configured to:

sequentially select a candidate node from the plurality of secondary nodes based on a descending order of priority levels; and when a domain name level of the resource server to which the first data resource belongs is equal to traffic-to-be-split domain name level included in the traffic scheduling information of the candidate node and the acquisition request of the first data resource does not satisfy preset traffic-splitting criteria, or the domain name level of the resource server to which the first data resource belongs is greater than the traffic-to-be-split domain name level included in the traffic scheduling information of the candidate node, determine the candidate node to be the target node.

Optionally, the probing response fed back by each of the plurality of secondary nodes includes traffic scheduling information carried thereby respectively, and the first node is further configured to:

based on traffic scheduling information carried in the probing response, update traffic scheduling information of each of the plurality of secondary nodes that is stored locally.

Optionally, the plurality of nodes further includes a third node, and the first node is further configured to:

receive a request response for a second data resource sent by a third node; and update traffic scheduling information of the third node stored locally based on traffic scheduling information of the third node carried in the request response.

Beneficial effects brought about by technical solutions of the present disclosure are as follows.

In the disclosed embodiments, when there is a need to transmit the acquisition request for the first data resource, the first node acquires traffic scheduling information of a plurality of secondary nodes stored locally corresponding to the resource server to which the first data resource belongs, where the traffic scheduling information is generated by nodes based on a local traffic loading condition; the first node selects a target node among the plurality of secondary nodes based on the traffic scheduling information of the plurality of secondary nodes; and the first node transmits the acquisition request for the first data resource to the target node. In this way, each mode may split traffic with a relatively low domain name level based on the traffic scheduling information of the secondary nodes, thereby ensuring that the traffic with a relatively high domain name level may obtain relatively satisfying back-to-source acceleration service. Accordingly, the occurrence of a reduced back-to-source efficiency of a dynamic parent node caused by the continuous overloading of the traffic may be avoid effectively, thereby improving the quality of the back-to-source acceleration service in the CDN service cluster.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Figure 1:
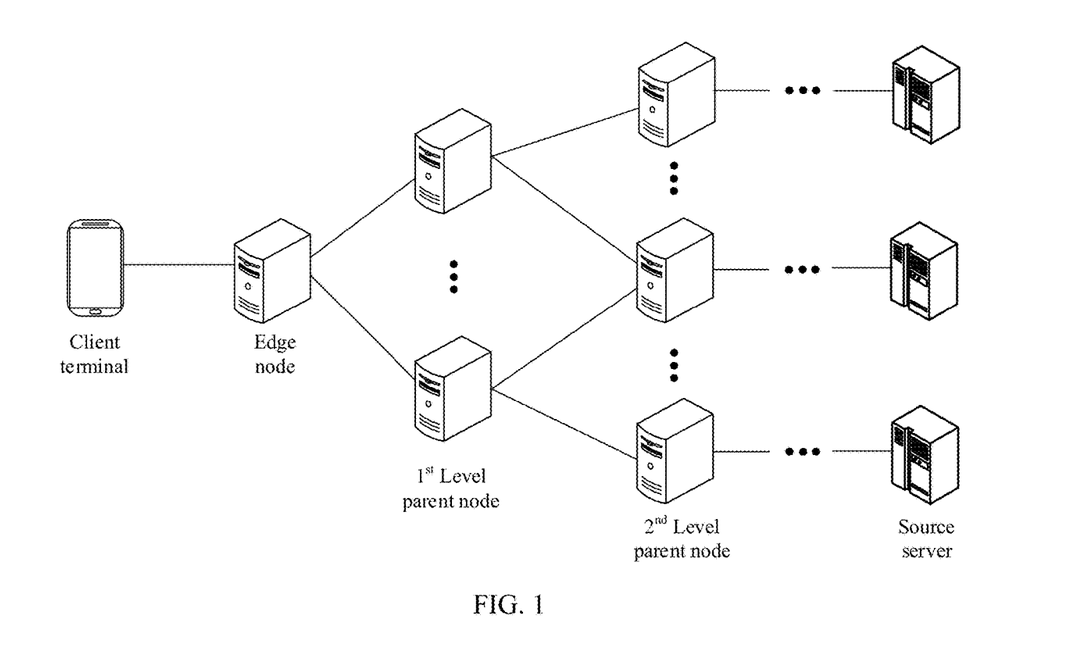
FIG. 1 is a schematic diagram of a network architecture of a CDN service cluster according to some embodiments of the present disclosure.

Embodiments of the present disclosure provide a method for transmitting a data resource acquisition request. The method may be cooperatively implemented by a plurality of node servers in a CDN service cluster. The network architecture may be as shown in FIG. 1. The node server may include edge node servers (hereinafter referred to as "edge nodes") and multi-level parent node servers (hereinafter referred to as "parent nodes"). Further, an edge node is an ingress node for a user request in the CDN service cluster, and a parent node is a node having a deployment level of the CDN service cluster after the edge node. The parent nodes include static parent nodes for caching the data resources and dynamic parent nodes for providing the back-to-source acceleration service. In the disclosed embodiments, the static parent nodes are not considered in subsequent descriptions that relate to nodes. That is, all nodes in the disclosed embodiments refer to the node servers in the CDN service cluster, but do not include terminals and resource servers. The aforementioned node server may include a processor, a memory, and a transceiver. The processor may be configured to process the transmitted data resource acquisition requests to be described hereinafter. The memory may be configured to store data required and generated in the following processes. The transceiver may be configured to receive and transmit the data involved in the following processes. In certain situations, the functions of a node server may be implemented by a server group that includes a plurality of servers. In some embodiments, a node server is described as a single server for illustrative purposes, and rest situation are similar thereto, which is not repeated herein.

Figure 2:
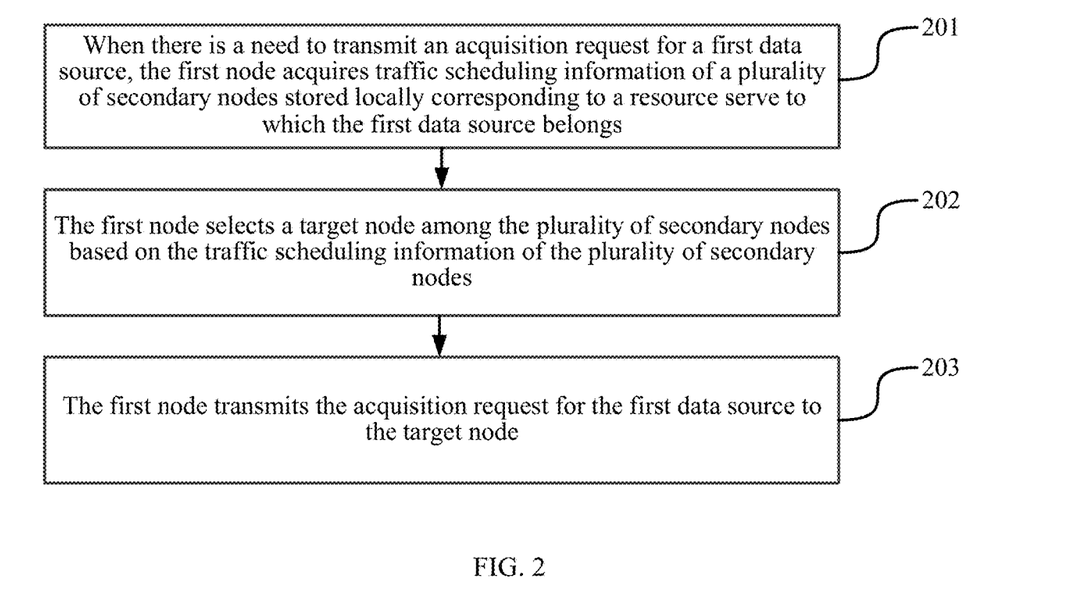
FIG. 2 is a flowchart of a method for transmitting a data resource acquisition request according to some embodiments of the present disclosure.

Specific illustrations of the processing processes in FIG. 2 are provided hereinafter with reference to some embodiments, which include:

Step 201: when there is a need to transmit an acquisition request for a first data resource, acquiring, by a first node, traffic scheduling information of a plurality of secondary nodes stored locally corresponding to a resource server to which the first data resource belongs.

The first node may be any node among edge nodes and dynamic parent nodes that have secondary nodes.

In one implementation, when providing the back-to-source acceleration service, a dynamic parent node may generate traffic scheduling information based on a local traffic loading condition, and feed back the traffic scheduling information to a higher level node in a predefined manner. After acquiring the traffic scheduling information of the dynamic parent node, the higher level node may store the acquired traffic scheduling information locally, such that a transmission path can be selected based on the traffic scheduling information when transmitting a data source acquisition request. Further, the dynamic parent node may divide domain names corresponding to each resource server into different levels based on an importance degree, thereby determining a plurality of domain name levels. The plurality of domain name levels may include an ordinary level, a V1 level, a V2 level, and a V3 level, which may be denoted by digits 0~3. A higher domain name level indicates a higher importance degree. Accordingly, the traffic scheduling information may include traffic-to-be-split domain name level and a corresponding traffic-to-be-split ratio. Specifically, the traffic scheduling information may be recorded in a manner of "lv1:lv2", where lv1 is traffic-to-be-split domain name level, and lv2 is traffic-to-be-split ratio. For example, the traffic scheduling information "0:10" indicates that the 10% traffic of the ordinary-level is spit, and the traffic of V1~V3 levels is not split. The traffic scheduling information "1:20" indicates that in the ordinary-level, traffic is fully spit, 20% traffic of the V1-level is split out, and the traffic of V2~V3 levels is not split. The traffic scheduling information "3:50" indicates that the traffic of ordinary level~V2 level is fully spit, and 50% traffic of the V3-level is split.

As such, when the first node is an edge node, after the first node receives a user's acquisition request for a certain data resource (e.g., a first data resource), if the first data source is not stored locally, the first node needs to transmit the corresponding acquisition request through other nodes to the resource server to which the first data source belongs. The first node may first determine a plurality of secondary nodes corresponding to the resource server to which the first data source belongs, and acquire the traffic scheduling information of the plurality of secondary nodes stored locally. When the first node is a dynamic parent node, after receiving the acquisition request for the first data source sent by a higher level node, the first node needs to forward the acquisition request through other nodes to the resource server to which the first data source belongs. The first node may first determine the plurality of secondary nodes corresponding to the resource server to which the first data source belongs, and acquire the traffic scheduling information of a plurality of secondary nodes stored locally. It is to be understood that for each resource server, the technical staff of the CDN service cluster may configure corresponding secondary nodes corresponding to the resource server in each edge node and dynamic parent nodes. That is, the present node may transmit the data resource acquisition request to the resource server through any of these secondary nodes.

Step 202: selecting, by the first node, a target node among the plurality of secondary nodes based on the traffic scheduling information of the plurality of secondary nodes.

In one implementation, after acquiring the traffic scheduling information of the plurality of secondary nodes, the first node may select, based on the traffic scheduling information, a target node among the plurality of secondary nodes for forwarding the acquisition request for the first data resource.

Step 203: transmitting, by the first node, the acquisition request for the first data resource to the target node.

In one implementation, after selecting the target node, the first node may transmit the acquisition request for the first data resource to the target node.

Optionally, a dynamic parent node may determine the traffic scheduling information based on the historical traffic of each domain name level, and corresponding processes are as follows: periodically acquiring, by the second node, historic traffic corresponding to each domain name level in a historic cycle, to predict latest traffic corresponding to each domain name level in a current cycle; and determining, by the second node, traffic scheduling information of the second node based on a preset traffic-splitting threshold and the latest traffic corresponding to each domain name level.

In particular, the second node may be any of the dynamic parent nodes for providing the back-to-source acceleration service, or may be any secondary node of any node in the CDN service cluster.

In one implementation, traffic server may be further configured in the service cluster. The traffic server is configured to record the actual traffic load status of each dynamic parent node, which includes the historical traffic corresponding to each domain name level at the dynamic parent node. When providing the back-to-source acceleration service, a dynamic parent node needs to periodically update the traffic scheduling information. Given the second node as an example, the second node may periodically acquire the local historical traffic corresponding to each domain name level in the historic cycle from traffic server, and based on such historical traffic, the second node may predict the latest traffic corresponding to each domain name level of a current cycle. Specifically, the least square fitting method or other feasible prediction algorithms may be used herein. Further, a second node may determine the traffic scheduling information of the second node in the current cycle based on the predicted latest total local traffic and the preset traffic-splitting threshold. It should be understood that, the preset traffic-splitting threshold may be traffic-dividing triggering value pre-configured by the technical staff of the CDN service cluster for each dynamic parent node, based on machine performances of each dynamic parent node. That is, when the total traffic in the current cycle exceeds the preset traffic-splitting threshold, the dynamic parent node may enter an overloading status, and the traffic needs to be split.

Optionally, the dynamic parent node may give priority to traffic splitting corresponding to an acquisition request of a low domain name level. Correspondingly, the process of determining the traffic scheduling information may be as follows: adding, by the second node, the latest traffic corresponding to each domain name level starting from a highest domain name level; when an adding result is greater than the preset traffic-splitting threshold, stopping adding and determining, by the second node, a domain name level corresponding to lastly added latest traffic as the traffic-to-be-split domain name level; determining, by the second node, a ratio of a difference between the adding result and the preset traffic-splitting threshold to latest traffic corresponding to the traffic-to-be-split domain name level as the traffic-to-be-split ratio.

In one implementation, during the process of generating the traffic scheduling information by the second node, the latest traffic corresponding to each domain name level may be added up starting from the highest domain name level. When the adding result is greater than the preset traffic-splitting threshold, the adding may be stopped and the last added domain name level may be determined to be the traffic-to-be-split domain name level. It is indicated that, when merely bearing all of the latest traffic both from traffic-to-be-split domain name level and higher domain name levels, the second node is already in an overloading status. Thus, partial traffic from the traffic-to-be-split domain name level and all latest traffic from the domain name levels lower than the traffic-to-be-split domain name level are split. As such, the second node may first calculate a difference value between the adding result and the preset traffic-splitting threshold (i.e., the amount of the partial traffic of the traffic-to-be-split domain name level), and further determine a ratio of such difference to the latest traffic corresponding to the traffic-to-be-split domain name level as the traffic-to-be-split ratio.

Optionally, a node may rank the priorities for all secondary nodes. The corresponding process may be as follows: a first node periodically sends probing messages to all secondary nodes; the first node receives a probing response fed back by each secondary node, and determines a network delay between the first node and each secondary node; the first node configures the priority of each secondary node based on the network delay, where a secondary node with a higher priority level corresponds to a smaller network delay.

In one implementation, a first node may periodically send probing messages to all pre-recorded secondary nodes. After receiving the probing message, a secondary node may feed back a corresponding probing response to the first node. Further, the first node may receive the probing response fed back by each secondary node, and determine the network delay between the first node and each secondary node based on the sending time of the probing message and the receiving time of each probing response. Further, the first node may determine a priority for each secondary node based on the aforementioned network delay. A secondary node with a higher priority level corresponds to a smaller network delay.

Optionally, the first node may preferentially send an acquisition request to a secondary node with a small network delay. Correspondingly, the process of step 202 may be as follows: the first node sequentially selects a candidate node from the plurality of secondary nodes based on a descending order of priority levels; when a domain name level of the resource server to which the first data resource belongs is equal to the traffic-to-be-split domain name level in the traffic scheduling information of the candidate node and the acquisition request for the first data resource does not satisfy the preset traffic-splitting criteria, or when the domain name level of the resource server to which the first data resource belongs is greater than the traffic-to-be-split domain name level in the traffic scheduling information of the candidate node, the candidate node is determined as the target node.

In one implementation, after acquiring the traffic scheduling information of a plurality of secondary nodes, based on the priorities of the plurality of secondary nodes, the first node may sequentially select a secondary node as a candidate node according to a descending order of the priorities. When the domain name level of the resource server to which the first data resource belongs is greater than the traffic-to-be-split domain name level in the traffic scheduling information of the candidate node, the candidate node may be determined as the target node. When the domain name level of the resource server to which the first data resource belongs is equal to the traffic-to-be-split domain name level in the traffic scheduling information of the candidate node, whether the acquisition request for the first data resource satisfies the preset traffic-splitting criteria is determined. If the acquisition request for the first data resource does not satisfy the preset traffic-splitting criteria, it means that there is no need to split the traffic for the acquisition request. Further, the candidate node may be selected as the target node. When the domain name level of the resource server to which the first data resource belongs is equal to the traffic-to-be-split domain name level in the traffic scheduling information of the candidate node and the acquisition request for the first data resource satisfies the preset traffic-splitting criteria, or when the domain name level of the resource server to which the first data resource belongs is lower than the traffic-to-be-split domain name level in the traffic scheduling information of the candidate node, it means the traffic for the acquisition request needs to be split. A next secondary node may be then selected as a candidate node. It should be noted that the foregoing preset traffic-splitting criteria may be arbitrary criteria for traffic division preset by the technical staff of the CDN service cluster. The criteria for traffic division for different secondary nodes may be the same or different. For example, a random number may be configured for each acquisition request, and if the random number is smaller than the traffic-to-be-split ratio in the traffic scheduling information, it is indicated that the corresponding acquisition request satisfies the preset traffic-splitting criteria.

Optionally, a secondary node may send the traffic scheduling information to the first node through a probing response or through a request response for a data resource, which may be specifically as follows:

Under situation 1, the first node updates the traffic scheduling information of each secondary node stored locally based on the traffic scheduling information carried in a probing response.

In one implementation, after the first node periodically sends probing messages to all the secondary nodes, each secondary node may add the locally generated latest traffic scheduling information to the probing response, and feed the probing response back to the first node. In this way, after receiving the aforementioned probing response, the first node may update the traffic scheduling information of each secondary node stored locally based on traffic scheduling information carried in the probing response.

Under situation 2, the first node receives a request response for a second data resource transmitted by a third node. The first node updates the traffic scheduling information of the third node stored locally based on traffic scheduling information of the third node carried in the request response.

The third node may be any of the dynamic parent nodes for providing the back-to-source acceleration service, or any secondary node of any node in the CDN service cluster. The third node may be the same as or different from the aforementioned second node.

In one implementation, if the first node successfully transmits, through the third node, an acquisition request for a second data resource to a certain resource server, after a certain period, the third node may receive a request response for the second data resource fed back by the resource server. The third node may add the locally generated latest traffic scheduling information to the request response and feed back the request response to the first node. As such, after the first node receives the request response of the second data resource transmitted by the third node, the traffic scheduling information of the third node stored locally may be updated based on the traffic scheduling information of the third node carried in the request response.

Figure 3:
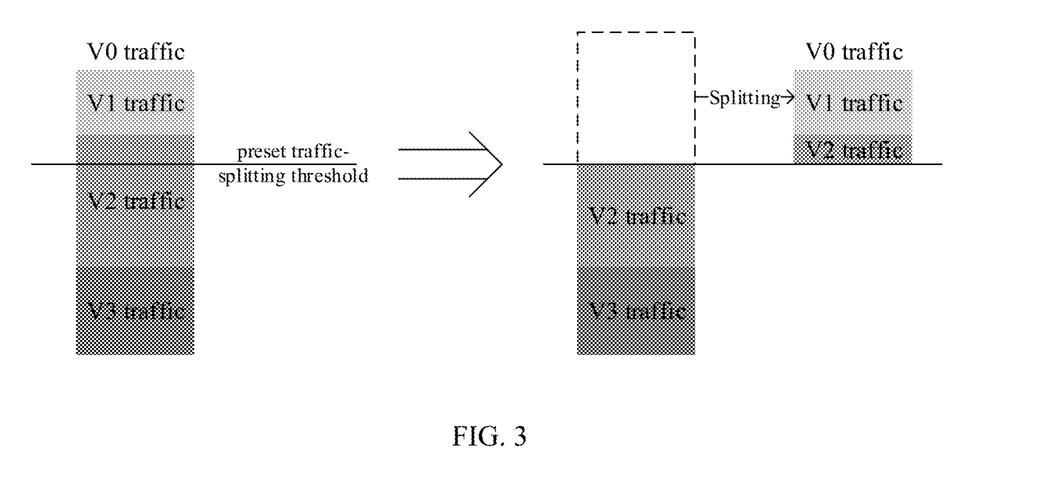
FIG. 3 is a principle diagram showing traffic dividing of a transmitted data resource acquisition request according to some embodiments of the present disclosure.

For ease of understanding, FIG. 3 is a principle diagram showing traffic dividing according to some embodiments of the present disclosure. If the traffic of a plurality of domain name levels exceeds the preset traffic-splitting threshold, the traffic from relatively low domain name levels is split, to ensure the remaining traffic does not exceed the preset traffic-splitting threshold.

In the disclosed embodiments, when there is a need to transmit the acquisition request for the first data resource, the first node acquires traffic scheduling information of a plurality of secondary nodes stored locally corresponding to the resource server to which the first data resource belongs, where the traffic scheduling information is generated by nodes based on the local traffic loading condition; the first node selects a target node among the plurality of secondary nodes based on the traffic scheduling information of the plurality of secondary nodes; and the first node transmits the acquisition request for the first data resource to the target node. As such, each node may split traffic of relatively low domain name levels based on the traffic scheduling information of the secondary nodes, thereby ensuring that the traffic of relatively high domain name levels receives relatively a satisfying back-to-source acceleration service. Accordingly, the occurrence of a reduced back-to-source efficiency of a dynamic parent node caused by the continuous overloading of the traffic may be avoid effectively, thereby improving the quality of the back-to-source acceleration service in the CDN service cluster.

Based on the similar technical concepts, the present disclosure further provides a system for transmitting a data source acquisition request. The system comprises a plurality of nodes, where the plurality of nodes includes a first node. The first node is configured to:

when there is a need to transmit an acquisition request for a first data source, acquire traffic scheduling information of a plurality of secondary nodes stored locally corresponding to a source server to which the first data source belongs, where the traffic scheduling information includes traffic-to-be-split domain name level and traffic-to-be-split ratio;

select a target node among the plurality of secondary nodes based on the traffic scheduling information of the plurality of secondary nodes; and transmit the acquisition request for the first data source to the target node.

Optionally, the plurality of nodes further includes a second node. The second node is configured to:

periodically acquire historic traffic corresponding to each domain name level in a historic cycle, to predict latest traffic corresponding to each domain name level in a current cycle; and determine traffic scheduling information of the second node based on a preset traffic-splitting threshold and the latest traffic corresponding to each domain name level.

Optionally, the second node is specifically configured to:
add latest traffic corresponding to each domain name level starting from a highest domain name level;

when an adding result is greater than the preset traffic-splitting threshold, stop adding and determine a domain name level corresponding to lastly added latest traffic as the traffic-to-be-split domain name level;

determine a ratio of a difference between the adding result and the preset traffic-splitting threshold to latest traffic corresponding to the traffic-to-be-split domain name level as the traffic-to-be-split ratio.

Optionally, the first node is further configured to:
periodically transmit a probing message to each of the plurality of secondary nodes;

receive a probing response fed back by each of the plurality of secondary nodes, and determine a network delay between the first node and each of the plurality of secondary nodes; and configure a priority level for each of the plurality of secondary nodes based on the network delay, where a secondary node with a higher priority level corresponds to a smaller network delay.

Optionally, the first node is specifically configured to:
sequentially select a candidate node from the plurality of secondary nodes based on a descending order of priority levels; and when a domain name level of the resource server to which the first data resource belongs is equal to traffic-to-be-split domain name level included in the traffic scheduling information of the candidate node and the acquisition request of the first data resource does not satisfy preset traffic-splitting criteria, or when the domain name level of the resource server to which the first data resource belongs is greater than the traffic-to-be-split domain name level included in the traffic scheduling information of the candidate node, determine the candidate node as the target node.

Optionally, the probing response fed back by each of the plurality of secondary nodes includes traffic scheduling information carried thereby respectively, and the first node is further configured to:

update traffic scheduling information of each of the plurality of secondary nodes that is stored locally based on traffic scheduling information carried in the probing response.

Optionally, the plurality of nodes further includes a third node, and the first node is further configured to:

receive a request response for a second data resource transmitted by a third node; and update traffic scheduling information of the third node that is stored locally based on the traffic scheduling information of the third node carried in the request response.

In the disclosed embodiments, when there is a need to transmit the acquisition request for the first data resource, the first node acquires traffic scheduling information of a plurality of secondary nodes stored locally corresponding to the resource server to which the first data resource belongs, where the traffic scheduling information is generated based on the local traffic loading condition; the first node selects a target node among the plurality of secondary nodes based on the traffic scheduling information of the plurality of secondary nodes; and the first node transmits the acquisition request for the first data resource to the target node. As such, each node may split traffic of relatively low domain name levels based on the traffic scheduling information of the secondary nodes, thereby ensuring that the traffic of relatively high domain name levels receives relatively a satisfying back-to-source acceleration service. Accordingly, the occurrence of a reduced back-to-source efficiency of a dynamic parent node caused by the continuous overloading of the traffic may be avoid effectively, thereby improving the quality of the back-to-source acceleration service in the CDN service cluster.

It is clear to those skilled in the art that the entire or partial steps of the disclosed embodiments may be implemented in the form of hardware or may be implemented in the form of software programs that instruct relevant hardware components. The software programs may be stored in a computer-readable storage medium. The storage medium may be a read-only memory, a magnetic disk, or an optic disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for transmitting a data resource acquisition request, the method comprising:
when there is a need to transmit an acquisition request for a first data resource, acquiring, by a first node, traffic scheduling information of a plurality of secondary nodes stored locally corresponding to a resource server to which the first data resource belongs, wherein the traffic scheduling information includes traffic-to-be-split domain name level and traffic-to-be-split ratio; the first node is any node among edge nodes and dynamic parent nodes that have secondary nodes;
selecting, by the first node, a target node among the plurality of secondary nodes based on the traffic scheduling information of the plurality of secondary nodes; and
transmitting, by the first node, the acquisition request for the first data resource to the target node;
the method further comprising:
periodically sending, by the first node, a probing message to each of the plurality of secondary nodes;
receiving, by the first node, a probing response fed back by each of the plurality of secondary nodes, and determining, by the first node, a network delay between the first node and each of the plurality of secondary nodes; and
configuring, by the first node, a priority level for each of the plurality of secondary nodes based on the network delay, wherein a secondary node with a higher priority corresponds to a smaller network delay;
wherein the selecting, by the first node, the target node among the plurality of secondary nodes based on the traffic scheduling information of the plurality of secondary nodes includes:
sequentially selecting, by the first node, a candidate node from the plurality of secondary nodes based on a descending order of priority levels; and
when a domain name level of the resource server to which the first data resource belongs is equal to traffic-to-be-split domain name level included in the traffic scheduling information of the candidate node and the acquisition request of the first data resource does not satisfy preset traffic-splitting criteria, or when the domain name level of the resource server to which the first data resource belongs is greater than the traffic-to-be-split domain name level included in the traffic scheduling information of the candidate node, determining, by the first node, the candidate node to be the target node.

2. The method according to claim 1, further comprising:
periodically acquiring, by a second node, historic traffic corresponding to each domain name level in a historic cycle, to predict latest traffic corresponding to each domain name level in a current cycle;
determining, by the second node, traffic scheduling information of the second node based on a preset traffic-splitting threshold and latest traffic corresponding to each domain name level.

3. The method according to claim 2, wherein the determining, by the second node, traffic scheduling information of the second node based on a preset traffic-splitting threshold and latest traffic corresponding to each domain name level includes:
adding, by the second node, latest traffic corresponding to each domain name level starting from a highest domain name level;
when an adding result is greater than the preset traffic-splitting threshold, stopping adding and determining, by the second node, a domain name level corresponding to lastly added latest traffic as the traffic-to-be-split domain name level;
determining, by the second node, a ratio of a difference between the adding result and the preset traffic-splitting threshold to latest traffic corresponding to the traffic-to-be-split domain name level as the traffic-to-be-split ratio.

4. The method according to claim 1, wherein the probing response fed back by each of the plurality of secondary nodes includes traffic scheduling information carried thereby respectively, and after receiving, by the first node, the probing response fed back by each of the plurality of secondary nodes, the method further includes:
updating, by the first node, traffic scheduling information of each of the plurality of secondary nodes based on traffic scheduling information carried in the probing response.

5. The method according to claim 1, further comprising:
receiving, by the first node, a request response for a second data resource sent by a third node; and
updating, by the first node, traffic scheduling information of the third node stored locally based on traffic scheduling information of the third node carried in the request response.

6. The method according to claim 1, wherein the selecting, by the first node, a target node among the plurality of secondary nodes based on the traffic scheduling information of the plurality of secondary nodes includes:
selecting, by the first node, the target node among the plurality of secondary nodes based on the traffic scheduling information of the plurality of secondary nodes, priority levels for the plurality of secondary nodes, preset traffic-splitting criteria and a domain name level of the resource server to which the first data resource belongs.

7. A system for transmitting a data resource acquisition request, the system comprising a plurality of nodes each including a processor and a memory, wherein the plurality of nodes includes a first node and when executing computer programs stored in a memory of the first node, a processor of the first node is configured to:
when there is a need to transmit an acquisition request for a first data resource, acquire traffic scheduling information of a plurality of secondary nodes stored locally corresponding to a resource server to which the first data resource belongs, wherein the traffic scheduling information includes traffic-to-be-split domain name level and traffic-to-be-split ratio; the first node is any node among edge nodes and dynamic parent nodes that have secondary nodes;
select a target node among the plurality of secondary nodes based on the traffic scheduling information of the plurality of secondary nodes; and
transmit the acquisition request for the first data resource to the target node;
wherein the processor of the first node is further configured to:
periodically send a probing message to each of the plurality of secondary nodes;
receive a probing response fed back by each of the plurality of secondary nodes, and determine a network delay between the first node and each of the plurality of secondary nodes; and
determine a priority level for each of the plurality of secondary nodes based on the network delay, wherein a secondary node with a higher priority level corresponds to a smaller network delay;
the processor of the first node is specifically configured to:
sequentially select a candidate node from the plurality of secondary nodes based on a descending order of priority levels; and
when a domain name level of the resource server to which the first data resource belongs is equal to traffic-to-be-split domain name level included in the traffic scheduling information of the candidate node and the acquisition request of the first data resource does not satisfy preset traffic-splitting criteria, or the domain name level of the resource server to which the first data resource belongs is greater than the traffic-to-be-split domain name level included in the traffic scheduling information of the candidate node, determine the candidate node to be the target node.

8. The system according to claim 7, wherein the plurality of nodes further includes a second node, and when executing computer programs stored in a memory of the second node, a processor of the second node is configured to:
periodically acquire historic traffic corresponding to each domain name level in a historic cycle, to predict latest traffic corresponding to each domain name level in a current cycle;
determine traffic scheduling information of the second node based on a preset traffic-splitting threshold and the latest traffic corresponding to each domain name level.

9. The system according to claim 8, wherein the processor of the second node is specifically configured to:
add the latest traffic corresponding to each domain name level starting from a highest domain name level;
when an adding result is greater than the preset traffic-splitting threshold, stop adding and determine a domain name level corresponding to lastly added latest traffic as the traffic-to-be-split domain name level;
determine a ratio of a difference between the adding result and the preset traffic-splitting threshold to latest traffic corresponding to the traffic-to-be-split domain name level as the traffic-to-be-split ratio.

10. The system according to claim 7, wherein the probing response fed back by each of the plurality of secondary nodes includes traffic scheduling information carried thereby respectively, and the processor of the first node is further configured to:
update traffic scheduling information of each of the plurality of secondary nodes based on traffic scheduling information carried in the probing response.

11. The system according to claim 7, wherein the plurality of nodes further includes a third node, and the processor of the first node is further configured to:
receive a request response for a second data resource transmitted by a third node; and
update traffic scheduling information of the third node stored locally based on traffic scheduling information of the third node carried in the request response.

* * * * *